April 10, 1956 P. ELIAS 2,741,428
MULTIPLIER CIRCUIT
Filed Sept. 3, 1952 2 Sheets-Sheet 1
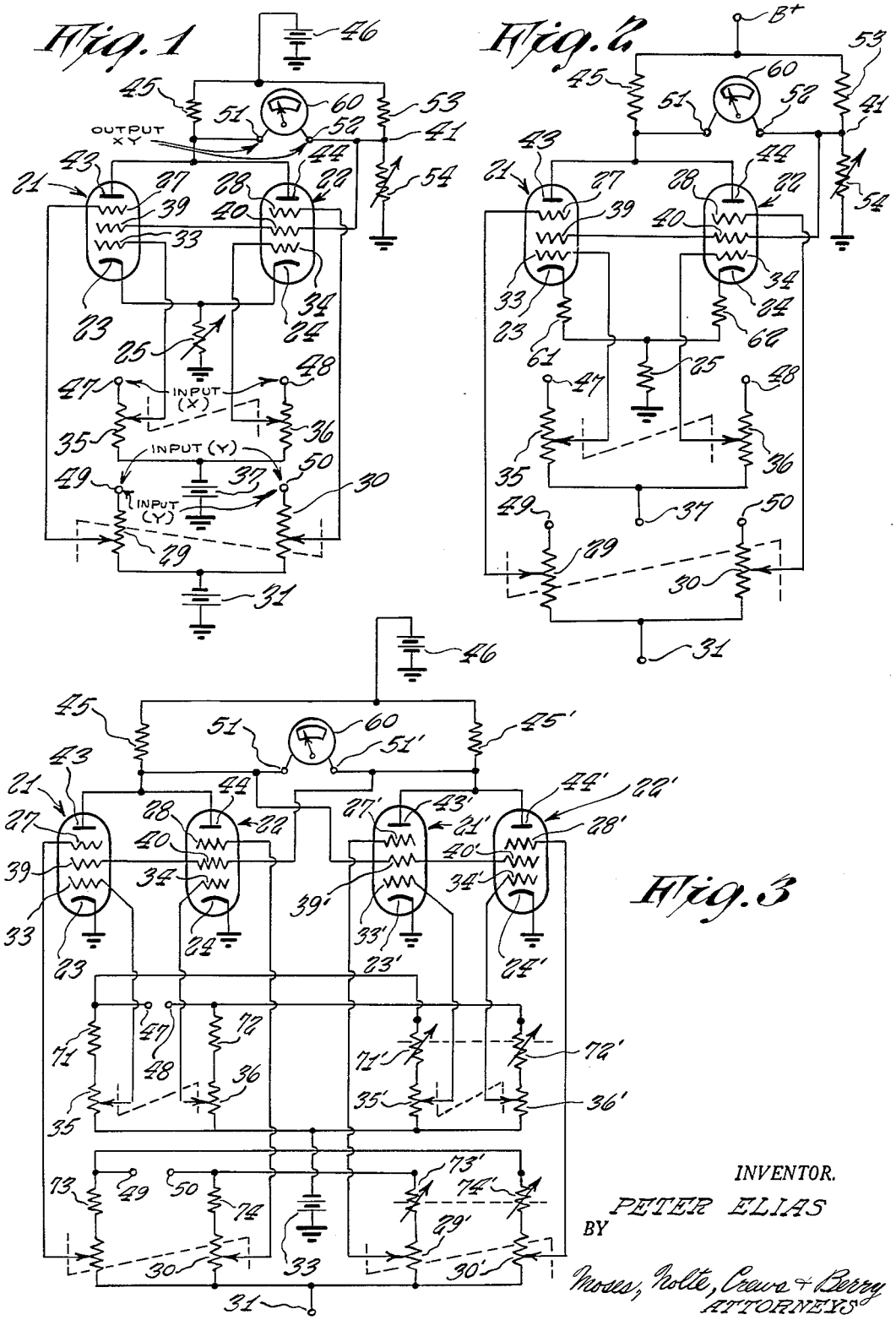
INVENTOR.
PETER ELIAS
BY
Moses, Nolte, Crews & Berry
ATTORNEYS April 10, 1956  P. ELIAS  2,741,428
MULTIPLIER CIRCUIT
Filed Sept. 3, 1952  2 Sheets-Sheet 2
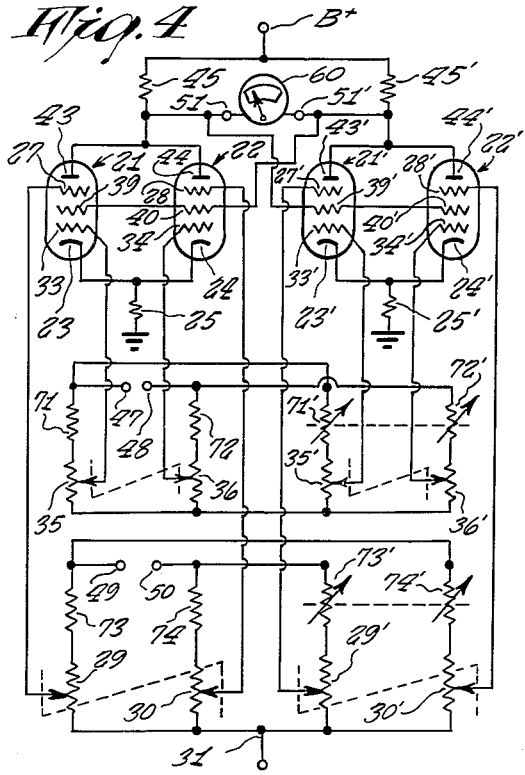
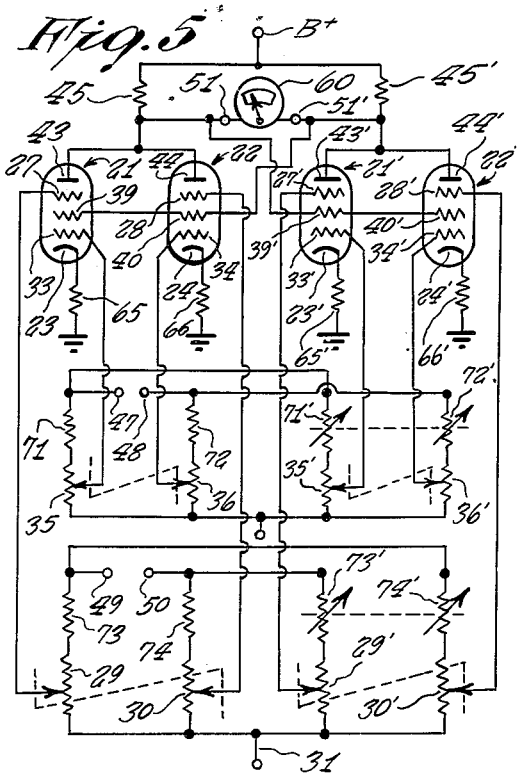
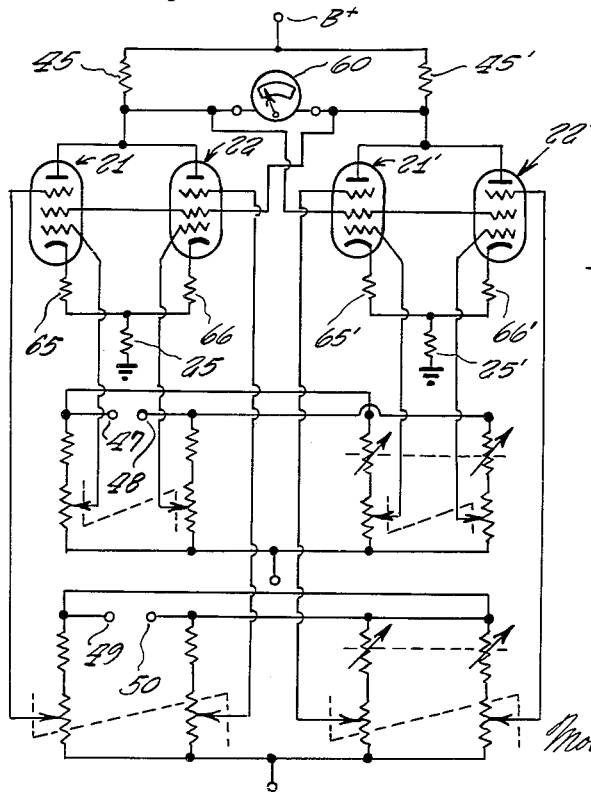
INVENTOR.
PETER ELIAS
BY
Moses, Nolte, Crews & Berry
ATTORNEYS United States Patent Office 2,741,428
Patented Apr. 10, 1956

2,741,428
MULTIPLIER CIRCUIT
Peter Elias, Cambridge, Mass.
Application September 3, 1952, Serial No. 307,581
13 Claims. (Cl. 235—61)

The present invention pertains to computing devices, and more particularly to devices of this character which will provide a continuous indication of the instantaneous magnitude of two independent variables, either or both of which may vary rapidly with respect to time.

This application is a continuation-in-part of my copending application, Serial No. 66,093, now Patent No. 2,661,152, filed December 18, 1948, for Computing Devices.

In my pending application, Serial No. 66,093, I show several forms for the circuits of my computing device and the present application relates to certain improvements which may be obtained by modification of the circuits shown in said application.

The circuit modifications of the present application involve the use of the changes in current in the screen grid circuits of the tubes in addition to the changes in current in their anode circuits. No additional apparatus is required.

These modified circuits provide the following improvements with respect to performance of the computer circuits shown in my copending application.

The magnitude of the output signal is approximately doubled when the output circuit of the computing device is connected to a load of low impedance.

The effective output impedance of the device is reduced, thereby raising the maximum frequency at which it will operate satisfactorily.

The effective output voltage, for a particular input signal, is increased by use of the present modified circuits.

The stability of performance is increased, and the drift of the output voltage in the absence of an input signal is reduced by the modifications embodied in present circuits.

An object of the invention is to provide a computing device of this character which will provide a degree of accuracy comparable to or superior to that obtainable with a conventional slide rule.

A further object of the invention is to provide such a computing device which requires no moving mechanical parts, the computation of the product of the two variables being effected substantially instantaneously by the use of electronic tubes and electrical circuits associated therewith.

Still another object of the invention is to provide an electrical computing device in which the instantaneous product of the two independent variables is derived as an electrical current suitable for use with indicating apparatus permitting its numerical evaluation. Accordingly, this current may be employed with electrical recording apparatus, either separately or in combination with indicating apparatus.

For the purpose of performing the multiplication, each of the two independent variables is expressed as a signal voltage whose instantaneous magnitude is proportional to the magnitude of one of the factors of the product and whose polarity is determined by the positive or negative coefficient of the factor.

Representing these two factors to be multiplied as the signal voltages $x$ and $y$, they may be applied to the circuit of a vacuum tube. This application may be as the algebraic sum of the two voltages applied to a single grid, or the two voltages may be applied separately to individual grids of a multiple grid tube. Assuming that the other electrodes of the tube remain at substantially fixed potentials in accordance with their normal operating conditions, the instantaneous value of the anode current, $i$, will be a continuous function of $x$ and $y$ and may be represented by a power series expansion applicable to any continuous function of two independent variables, namely:

$$i = a + (b_1 x + b_2 y) + (c_1 x^2 + c_2 xy + c_3 y^2) + \\ (d_1 x^3 + d_2 x^2 y + d_3 x y^2 + d_4 y^3) + \\ (e_1 x^4 + e_2 x^3 y + e_3 x^2 y^2 + e_4 x y^3 + e_5 y^4) + \\ \text{terms of higher degree}$$

where $a$ is a residual current which flows when the simultaneous value of both applied signals is zero and the letters with subscripts are power series coefficients. If a resistor is included in the anode circuit of the tube, the potential drop across this resistor will at all times be proportional to the magnitude of the current flowing therethrough. Accordingly, the potential drop across such a resistor may be expressed in substantially the same form as the expression given above for the value of the current, $i$. The numerical values for the coefficients in both expressions will be related by a constant factor of proportionality.

By means of the above expansion of the general expression for the value of a function of two independent variables, it may be shown that the outputs of two tubes may be combined in such manner that a current or voltage may be derived from the combined outputs which, for practical purposes, is directly proportional to the instantaneous value of the product of the two variables.

This multiplier unit may also be combined with one or more known units for performing other operations of computation, either separately or in combination with other multiplying units in accordance with the present invention to derive outputs which are proportional to other functions of the two independent variables such as their quotient, for example, or a root or power of a single variable, including powers involving fractional exponents. Such combination with other known computing devices can be extended to cover various algebraic functitons of one or more variables, the only limitation being practical consideration of size and the necessity for constructing actual physical units which will perform with the required degree of accuracy where numerous successive operations are involved.

Accordingly, a further object of the invention is the provision of a computing device which will instantaneously and continuously indicate the value of an algebraic function of one or more independent variables.

Still another object of the invention is the provision of a circuit comprising corrective features which diminish the effects of inherent inaccuracies of the device and extend its range of useful accuracy.

Other and further objects will become apparent upon reading the following specification together with the accompanying drawing forming a part hereof.

Referring to the drawing,

Figure 1 is a schematic circuit diagram of an embodiment of the invention in its simplest form;

Figure 2 is a diagram of a modification of the circuit shown in Figure 1;

Figure 3 shows a circuit comprising two circuits similar to Figure 1, combined to extend the range of useful accuracy of the device;

Figure 4 is a modification of Figure 3;

Figure 5 is a further modification of Figure 3; and

Figure 6 is still another modification of the circuit of Figure 3.

Referring to Figure 1, there is shown a pair of pentodes 21 and 22 having their cathodes 23 and 24 returned to ground through a common impedance means indicated illustratively as the adjustable cathode resistor 25. Their suppressor grids 27 and 28 are connected together through ganged potentiometers 29 and 30 respectively to a suitable source of biasing potential indicated by way of illustration as a battery 31. The control grids 33 and 34 are shown connected through further ganged potentiometers 35 and 36 respectively to another suitable source of biasing potential, similarly illustrated as a battery 37.

The screen grids 39 and 40 are shown connected together and in like phase to the junction point 41 between two resistors 53 and 54.

Anodes 43 and 44 are connected together and are further connected in like phase through a common impedance or resistor 45 to a suitable source of anode potential indicated as a battery 46.

Terminals 47 and 48, designated "Input $(x)$" are connected to the free ends of the ganged potentiometers 35 and 36 respectively.

Terminals 49 and 50, designated "Input $(y)$" are connected to the free ends of the ganged potentiometers 29 and 30 respectively.

A pair of terminals 51 and 52 is designated "Output $(xy)$." Terminal 51 is connected to anodes 43 and 44 in multiple. Terminal 52 is connected to the junction point 41 between resistors 53 and 54. Resistors 53 and 54 are connected in series from the anode supply to ground, and the resistor 54 is indicated as being adjustable in value. This adjustability permits control of the potential between junction point 41 and ground, so that terminals 51 and 52 may be brought to the same potential for purposes of calibration as hereinafter described.

A zero-center indicating device 60 is shown connected to the output terminals 51 and 52. This may be a voltmeter or milliammeter of suitable characteristics. The output terminals 51 and 52 may also be connected to other computing apparatus for further use, such as the input terminals of another multiplying device similar to the device herein described, for example, where products of higher orders are desired.

The ganged potentiometers 35 and 36 are substantially identical and are indicated diagrammatically as being mechanically interlinked in such manner that upon movement of one of the movable contacts in one direction, the other movable contact will be moved by the same amount in the opposite direction. This results in the inclusion of a substantially constant value of resistance between the two movable contacts throughout their full range of adjustability. Because of the identical construction of the two potentiometers 35 and 36, the same total portion of the input signal voltage $(x)$ is applied in opposite phase to the two grids 33 and 34, but the zero axis or center point may be adjusted to compensate for differences between the characteristics of the two tubes 21 and 22. This is also true of ganged potentiometers 29 and 30 which are associated with the suppressor grids 27 and 28 of pentodes 21 and 22, respectively.

When the movable contacts of potentiometers 29, 30, 35 and 36 are centrally positioned in their ranges of adjustability as indicated in Fig. 1, and an input voltage having a magnitude of $4x$ is applied to terminals 47 and 48, the voltage applied to control grid 33 of pentode 21 will be $x$ and the voltage applied to the control grid 34 of pentode 22 will be $-x$. The values of $x$ and $-x$, of course, represent the change from the normal voltage impressed on these grids by the source of biasing potential 37.

Similarly, if an input voltage having a magnitude of $4y$ is impressed on terminals 49 and 50, the change in voltage on suppressor grid 27 of pentode 21 will be $y$ and the corresponding change in voltage on the suppressor grid 28 of pentode 22 will be $-y$.

Denoting the magnitude of the anode current of pentode 21 as $i_1$ and the magnitude of the anode current of pentode 22 as $i_2$ and the total current flow to both anodes 43 and 44 as $I'$, we may write the following expressions, assuming that the pentodes 21 and 22 are identical in all respects.

$i_1 = a + (b_1x + b_2y) + (c_1x^2 + c_2xy + c_3y^2) + (d_1x^3 + d_2x^2y + d_3xy^2 + d_4y^3) + (e_1x^4 + e_2x^3y + e_3x^2y^2 + e_4xy^3 + e_5y^4) +$ terms of higher degree.

$i_2 = a - (b_1x + b_2y) + (c_1x^2 + c_2xy + c_3y^2) - (d_1x^3 + d_2x^2y + d_3xy^2 + d_4y^3) + (e_1x^4 + e_2x^3y + e_3x^2y^2 + e_4xy^3 + e_5y^4) +$ terms of higher degree.

Adding these two expressions for $i_1$ and $i_2$ to obtain an expression for the total current $I'$, we have:

$I' = i_1 + i_2 = 2a + 2(c_1x^2 + c_2xy + c_3y^2) + 2(e_1x^4 + e_2x^3y + e_3x^2y^2 + e_4xy^3 + e_5y^4) +$ terms of higher degree.

It will be noted that the terms linear in $x$ and $y$, and all other terms of odd degree, have disappeared in the output $I'$. For small values of $x$ and $y$ the terms of fourth and higher degrees become insignificant. For example, by reducing $x$ and $y$ each by a factor of 10 the terms of second degree are reduced by a factor of 100, but the terms of fourth degree or higher are reduced by a factor of 10,000 or more, so that they have less than $\frac{1}{100}$ of their previous relative importance. By suitable choice of the bias voltages of batteries 31 and 37 for a given value of cathode resistor 25, the coefficients of the terms in $x^2$ and $y^2$ may be made small enough so that the product is the dominant term in the expression for total current $I'$.

In practice of course the two tubes are not identical, and the cancellation of terms of odd degree discussed above is not complete. However, by adjusting the dual potentiometers 29—30 and 35—36 the linear terms in $x$ and $y$ may be completely cancelled. The extent to which terms of higher odd degree then cancel depends on how similar the tubes are. Experimental results obtained with pairs of tubes purchased at the same time but not especially selected for uniformity, showed an output approximately proportional to the product of the input voltages could be obtained in which the higher order odd terms were less important than the terms remaining in $x^2$ and $y^2$.

The foregoing takes into consideration, only the changes in potential at the anodes. It is assumed that the common anode resistor 45 is of comparatively high value, as is the common cathode resistor 25, thereby tending to maintain a constant total space current in the two pentodes. Any change in anode current must therefore be accompanied by a substantially equal and opposite change in current in the screen grid circuit, since there is no other electrode from which this current may be obtained. Accordingly, any change in potential across anode resistor 45 will be accompanied by a corresponding change in potential across the screen grid resistor 53. The output terminals 51 and 52 are thus connected to points which are opposite in phase. Since the indicator 60 is connected between these two resistors, its indication will be determined by the cumulative effects of the changes in the potential drops across both the anode resistor 45 and the screen resistor 53. Moreover, since the indicator 60 is connected between the anodes and the screen grids of the pentodes 21 and 22, it is operating in a circuit of relatively low impedance, thereby permitting the use of higher operating frequencies with satisfactory results.

The experimental results were entirely satisfactory for small values of $x$ and $y$.

Fig. 2 shows a modification of the circuit of Fig. 1 in which the linearity is improved and in which the range of linearity is extended by the inclusion of additional individual cathode resistors 61 and 62 which produce a negative feedback effect. This reduces the magnitude of the coefficients of the $x^2$ and $y^2$ terms in the expression for total current $I'$ given above. It also renders the circuit less sensitive to slight variations in supply voltages and to the effects of aging of the tubes.

Compensation for the differences between tubes may be effected in other ways than the manner shown in Figs. 1 and 2. The bias potentials may be made individually adjustable, or the screen potentials may be made individually adjustable. The resistors 61 and 62 in Fig. 2 may be made adjustable. The ganged potentiometer arrangement illustrated or some equivalent balanced arrangement is to be preferred, however, since it minimizes interaction between controls.

Fig. 3 shows a further modified form of the invention in which more accurate proportionality throughout a greater range may be obtained by the use of four pentodes 21, 22, 21' and 22'. The arrangement of the circuits is generally similar to that of Fig. 1, two circuits similar to Fig. 1 being combined. In order to permit adjustment of the input voltages so that equalization may be provided to take care of differences in tube characteristics, a pair of fixed resistors 71 and 72 are included in the circuits of potentiometers 35 and 36 respectively. A similar pair of resistors 71' and 72' are included in the circuits of potentiometers 35' and 36', but resistors 71' and 72' are made adjustable so that the distribution of input voltage between the pair of pentodes 21—22 may be adjusted relatively to the input voltage to the pair of pentodes 21'—22'. Within each pair 21—22 or 21'—22', the potentiometers 35—36 and 35'—36' permit adjustment to compensate for differences between the tubes of the pair. Adjustable resistors 71' and 72' are substantially identical in construction and are indicated as being ganged together. The mechanical connection between these adjustable resistors is such that they increase or decrease their resistance values together and to substantially the same extent.

Similarly, fixed resistors 73 and 74 are associated with potentiometers 29 and 30 and ganged adjustable resistors 73' and 74' are associated with potentiometers 29' and 30' for the purpose of adjusting the distribution of the input applied to terminals 49 and 50 between the two pairs of pentodes 21—22 and 21'—22'.

The fixed resistors 71 and 72 are of substantially one-half the maximum value of the ganged adjustable resistors 71' and 72'. Similarly, fixed resistors 73 and 74 are of substantially one-half the maximum value of ganged adjustable resistors 73' and 74'.

Assume the condition where all of the resistors and potentiometers of Fig. 3 are set at the centers of their respective ranges of adjustability, and assume that a first input signal having a voltage value assumed to be $6x$ is applied to terminals 47 and 48. The change in grid potential at control grid 33 of pentode 21 will be $x$ and at control grid 34 of pentode 22 will be $-x$. Because of the symmetry of the circuits, similar changes of $x$ and $-x$ will occur at control grids 33' and 34' of pentodes 21' and 22' respectively.

Correspondingly, assuming a second input signal having a voltage value of $6y$ to be applied to input terminals 49 and 50 of Fig. 3, changes in grid potential of magnitude $y$ will occur at suppressor grids 27 and 28' of pentodes 21 and 22' and a change of potential of magnitude $-y$ will occur at suppressor grids 28 and 27' of pentodes 22 and 21' respectively.

As previously derived for the circuit of Fig. 1, the expression for current in common anode resistor 45 of pentodes 21 and 22 will be $$I' = i_1 + i_2 = 2a + 2(c_1x^2 + c_2xy + c_3y^2) + 2(e_1x^4 + e_2x^3y + e_4xy^3 + e_5y^4)$$

terms of higher degree.

In the other pair of pentodes, 21' and 22', however, the second input current is reversed in phase. Representing the current in pentode 21' as $i_3$ and in 22' as $i_4$ and the sum of these two currents, $i_3 + i_4$ as $I''$ the following expression may be derived for $I''$:

$$i_3 = a + (b_1x - b_2y) + (c_1x^2 - c_2xy + c_3y^2) + (d_1x^3 - d_2x^2y + d_3xy^2 - d_4y^3) + (e_1x^4 - e_2x^3y + e_3x^2y^2 - e_4xy^3 + e_5y^4) +$$
terms of higher degree.

$$i_4 = a - (b_1x - b_2y) + (c_1x^2 - c_2xy + c_3y^2) - (d_1x^3 - d_2x^2y + d_3xy^2 - d_4y^3) + (e_1x^4 - e_2x^3y + e_3x^2y^2 - e_4xy^3 + e_5y^4) +$$
terms of higher degree.

$$I'' = 2a + 2(c_1x^2 - c_2xy + c_3y^2) + 2(e_1x^4 - e_2x^3y + e_3x^2y^2 - e_4xy^3 + e_5y^4) + \text{terms of higher degree.}$$

If a current indicating device such as the zero center milliammeter 60 be connected between output terminals 51 and 51' of Fig. 3, its deflection will be proportional to the difference between the potential drops across equal resistors 45 and 45', which in turn will be proportional to the difference between the currents $I'$ and $I''$ respectively, flowing in these equal resistors. (Assuming that the effects of current flow through the milliammeter are sufficiently small so that they may be neglected.)

Representing the difference between $I'$ and $I''$ as $I$, this may be expressed by Formula A:

$$I = 4c_2xy + 4(e_2x^3y + e_4xy^3) + \text{terms of higher degree.}$$

It will be noted that in this latter expression which applies to Fig. 3, the cancellation of undesired terms is much more complete than in the earlier expression which applies to Fig. 1. The only uncancelled terms are those containing products of odd powers of $x$ and $y$.

As in the case of Fig. 1, adjustment for differences in tube characteristics may be made by making various resistors individually adjustable. Individual adjustability of biasing potentials may also be used. The arrangement shown, however, minimizes interaction between controls in the course of making such adjustments.

To obtain zero output reading with no input, it has been found possible to adjust either the zero corrector of the indicating instrument 60 which changes the mechanical bias of the hairspring therein, or to vary the value of either of the resistors 45 or 45' by making one of them adjustable. Individual adjustment of the biasing potential for the pair of pentodes 21—22 or 21'—22' will also accomplish this result.

In connection with Fig. 3, it should be noted that the screen grids 39 and 40 of pentodes 21 and 22 respectively, are connected to the low voltage side of anode resistor 45' along with anodes 43' and 44' of pentodes 21' and 22' and output terminal 51'. The screen grids 39' and 40' of pentodes 21' and 22' are symmetrically connected with respect to the screen grids 39 and 40 to the low voltage side of anode resistor 45 along with the anodes 43 and 44 of pentodes 21 and 22 and output terminal 51.

As described above, in connection with Fig. 1, the circuits of each pair of pentodes 21—22 and 21'—22' are such that there is a tendency to maintain a constant cathode current, or total space current in each pair of pentodes, an increase in anode current in either pair of pentodes will therefore be accompanied by a decrease in screen grid current in the pair of pentodes in which the increase in anode current occurred, and vice versa. The symmetrical cross connection of the screen grids of each pair of pentodes to the anodes of the other pair of pentodes consequently produces a cumulative change in the potential drop across each of the anode resistors 45 and 45', and these changes are thereby increased with respect to the changes which would otherwise be obtained if the screen grids were maintained at a relatively fixed potential, in the usual manner. By thus symmetrically cross-connecting the screen grids and the anodes of each pair of pentodes, an output is obtained which is approximately twice as great as the output when the screen grids are operated at a fixed potential, without being connected into the output circuit as shown in Fig. 3.

Fig. 4 shows a modification of the circuit of Fig. 3 in which the resistors 25 and 25' are included in the common cathode return circuit of the pairs of pentodes 21—22 and 21'—22' respectively. The addition of these resistors 25 and 25' reduces the magnitude of undesired terms containing even powers of x and y in the output circuit of each pair of tubes thereby facilitating balancing.

Fig. 5 illustrates a further modification of the circuit of Fig. 3. Individual resistors 65, 66, 65' and 66' are shown included in the cathode return circuits of the pentodes 21, 22, 21' and 22' respectively. The circuit of Fig. 5 is otherwise the same as that of Fig. 3. This modification offers further improvement in the range of linearity. Experimentally, the circuit of Fig. 5 has been found to be easier to balance than that of Fig. 3 or of Fig. 4 and also exhibits less tendency to drift out of calibrated conditions.

Fig. 6 shows a further modification of the circuit of Fig. 3 which combines the modifications of Fig. 4 and Fig. 5. Individual cathode resistors 65 and 66 are connected jointly to common cathode resistor 25 for pentodes 21 and 22. Correspondingly, individual cathode resistors 65' and 66' are connected jointly to common cathode resistor 25' for pentodes 21' and 22'. The values of the resistors may be made smaller while retaining the same linearity as in Fig. 5, thereby improving the sensitivity of the circuit.

The increased stability and enlarged range of linearity of the circuits shown in Figs. 4, 5 and 6 is the result of negative feedback action produced by the cathode resistors used in these circuits.

Having thus described my invention, it is to be understood that only some of the several embodiments thereof have been specifically shown, and that other means and apparatus for practicing the invention will be apparent to those skilled in the art from a perusal hereof.

I claim:

1. A computing device for continuously determining the instantaneous value of the product of two independent variables, one variable being designated $x$ and the other $y$ comprising: a pair of symmetrically connected electron discharge devices, each device having an anode, a cathode, a screen grid and at least two control grids; a first circuit means connecting the pair of anodes in like phase to a common source of anode current; a second circuit means connecting the pair of screen grids in like phase to a common source of screen grid current; a third circuit means symmetrically connecting a first pair of control grids for energization in opposite phase by an electrical voltage whose instantaneous value is directly proportional to one of the independent variables $x$; a fourth circuit means symmetrically connecting another pair of control grids for energization in opposite phase by an electrical voltage whose instantaneous value is directly proportional to the other independent variable $y$; a fifth circuit means including impedance means common to the two cathodes for completing the anode-cathode circuit of the two discharge devices; and an output circuit connected between a point in the first circuit means common to the two anodes and a point in the second circuit means common to the two screen grids and opposite in phase to said point in said first circuit means whereby when two voltages, one being proportional to $x$ and the other proportional to $y$ are applied to the two pairs of control grids and are of suitably small magnitudes, the magnitude of the output of the output circuit, when expanded as a power series function, will be proportional to the expression $(c_1x^2+c_2xy+c_3y^2)+(e_1x^4+e_2x^3y+e_3xy^3+e_4y^4)+$ terms of higher degrees in which the letters with subscripts are power series coefficients thus being substantially proportional to the instantaneous product of the two variables, the other functions of the two variables being sufficiently small to permit their values to be neglected.

2. A computing device according to claim 1, wherein the normal potential of the point in the second circuit means common to the two screen grids is adjustably fixed.

3. A computing device according to claim 1, wherein the impedance means is a resistor.

4. A computing device as in claim 1 in which the third and fourth circuit means each include a resistor to which each voltage is individually applied, and individual adjusting means for each resistor connected to apply a fixed portion of each voltage to each pair of control grids, the adjusting means being connected to apply the fixed portion of each voltage in adjustable ratio directly to each control grid of the pair.

5. A computing device as in claim 1 in which the fifth circuit means further comprises two separate impedance means both connected to the common impedance means and each individually connected to one of the two cathodes for providing a negative feed-back effect to stabilize operation of the computing device and to reduce the magnitude of all functions of the two variables other than the product thereof which would otherwise be present in the output circuit.

6. A computing device for continuously determining the instantaneous value of the product of two independent variables, one variable being designated $x$ and the other $y$, comprising: two pairs of symmetrically connected electron discharge devices, each device having an anode, a screen grid, a cathode and at least two control grids; two first circuit means each connecting each pair of anodes in like phase to a source of anode current; a second circuit means symmetrically connecting each pair of screen grids in like phase to the opposite pair of anodes; a third circuit means symmetrically connecting a pair of control grids in each pair of discharge devices for common energization in opposite phase and in opposite phase within each pair by an electrical voltage whose instantaneous value is directly proportional to one of the independent variables $x$; a fourth circuit means symmetrically connecting another pair of control grids in each pair of discharge devices for common energization in opposite phase and in opposite phase within each pair by an electrical voltage whose instantaneous value is directly proportional to the other independent variable $y$; a fifth circuit means connecting the four cathodes to complete the anode-cathode circuit of the discharge devices; and an output circuit connected symmetrically intermediate the two pairs of anodes, whereby when two voltages, one being proportional to $x$ and the other proportional to $y$ are applied to the four pairs of control grids and are of suitably small magnitudes, the magnitude of the output of the output circuit, when expanded as a power series function, will be proportional to the expression $c_2xy+(e_2x^3y+e_4xy^3)+$ terms of higher degrees, in which the letter with subscripts are power series coefficients, thus being substantially proportional to the instantaneous product of the two variables, the other functions of the two variables being sufficiently small to permit their values to be neglected.

7. A computing device as in claim 6 in which the third and fourth circuit means each include a pair of resistors, each variable voltage being individually applied to each pair, and individual adjusting means for each resistor connected to apply a fixed portion of each voltage to each pair of control grids, the adjustment means being connected to apply the fixed portion of each voltage in adjustable ratio directly to each control grid of the pair.

8. A computing device as in claim 6 in which the fifth circuit means comprises two separate impedance means each common to the cathodes of one pair of discharge devices for producing a negative feedback effect.

9. A computing device as in claim 6 in which the fifth circuit means comprises four separate impedance means each individually connected to one of the cathodes producing a negative feedback effect.

10. A computing device as in claim 6 in which the fifth circuit means comprises four separate impedance means each individually connected to one of the cathodes and two further impedance means each common to the cathodes of one pair of discharge devices, for producing a negative feedback effect.

11. A computing device as in claim 6 in which the third and fourth circuit means each include a pair of resistors, each variable voltage being individually applied to each pair, and individual adjusting means for each resistor connected to apply a fixed portion of each voltage to each pair of control grids, the adjusting means being connected to apply the fixed portion of each voltage in adjustable ratio directly to each control grid of the pair, and in which the fifth circuit means comprises two separate impedance means each common to the cathodes of one pair of discharge devices for producing a negative feedback effect.

12. A computing device as in claim 6 in which the third and fourth circuit means each include a pair of resistors, each variable voltage being individually applied to each pair, and individual adjusting means for each resistor connected to apply a fixed portion of each voltage to each pair of control grids, the adjusting means being connected to apply the fixed portion of each voltage in adjustable ratio directly to each control grid of the pair, and in which the fifth circuit means comprises four separate impedance means each individually connected to one of the cathodes for producing a negative feedback effect.

13. A computing device as in claim 6 in which the third and fourth circuit means each include a pair of resistors, each variable voltage being individually applied to each pair, and individual adjusting means for each resistor connected to apply a fixed portion of each voltage to each pair of control grids, the adjusting means being connected to apply the fixed portion of each voltage in adjustable ratio directly to each control grid of the pair, and in which the fifth circuit means comprises four separate impedance means each individually connected to one of the cathodes and two further impedance means each common to the cathodes of one pair of discharge devices, for producing a negative feedback effect.

References Cited in the file of this patent
UNITED STATES PATENTS

| | | |
|---|---|---|
| 1,869,209 | Mead | July 26, 1932 |
| 1,977,536 | Tubbs | Oct. 16, 1934 |
| 2,306,456 | Mayne | Dec. 29, 1942 |
| 2,425,405 | Vance | Aug. 12, 1947 |
| 2,428,541 | Bagley | Oct. 7, 1947 |
| 2,441,127 | Atkins | May 11, 1948 |
| 2,441,387 | Berger | May 11, 1948 |
| 2,540,825 | Lafferty | Feb. 6, 1951 |

OTHER REFERENCES

Theory of Mathematical Machines, by Murray, King's Crown Press; 1948, page III-13.

MIT Radiation Laboratory Series, "Waveforms," vol. 19; page 668, sec. 19.2.